Sept. 19, 1944. F. A. McMURRAY 2,358,408
COUPLING
Filed Feb. 18, 1943
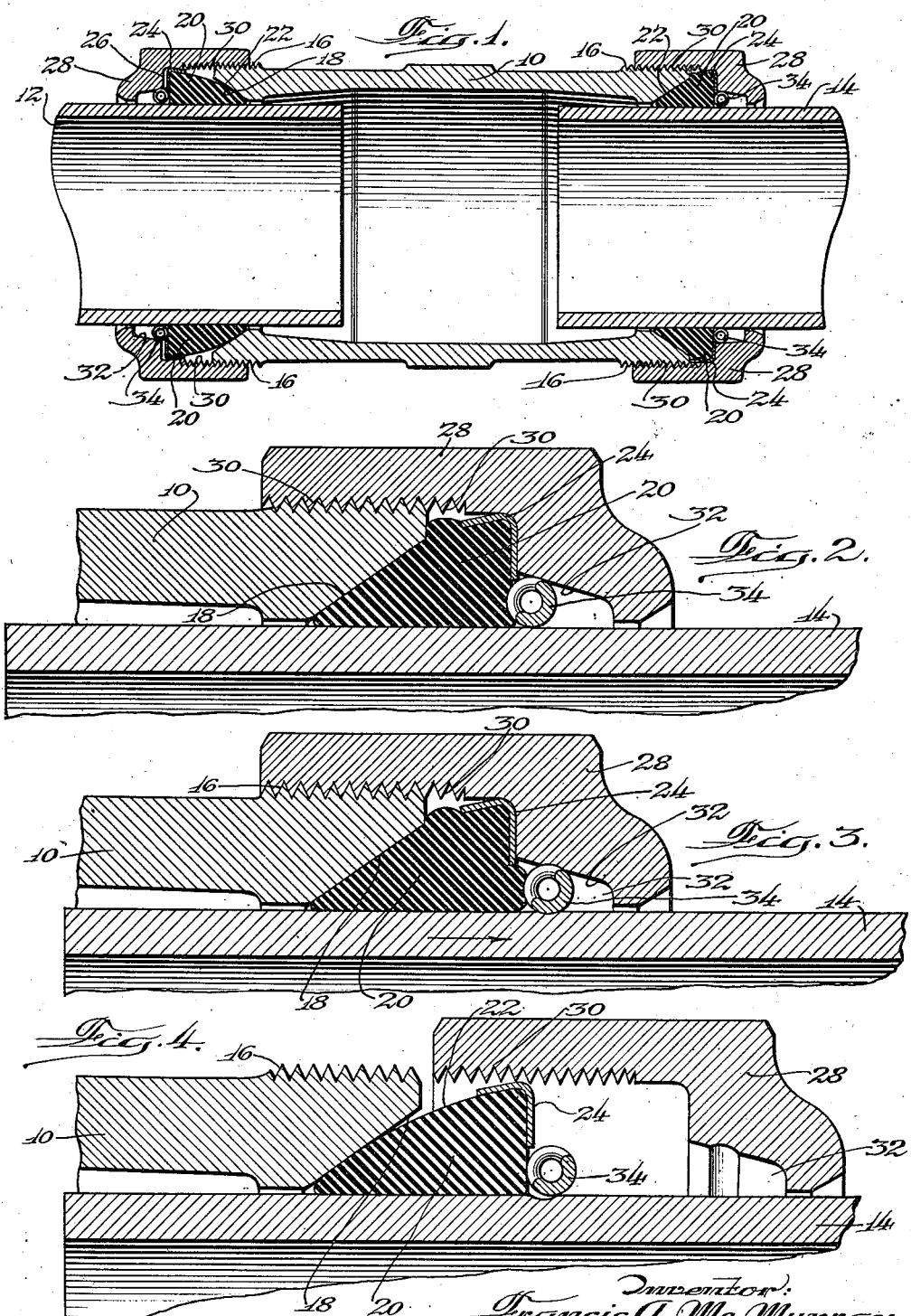
Inventor:
Francis A. McMurray
By Williams, Bradbury & Hinkle
Attorneys.

Patented Sept. 19, 1944

2,358,408

UNITED STATES PATENT OFFICE 2,358,408

COUPLING

Francis A. McMurray, Chicago, Ill., assignor to Norton-McMurray Manufacturing Company, Chicago, Ill., a corporation of Illinois Application February 18, 1943, Serial No. 476,270

2 Claims. (Cl. 285—196)

My invention relates to couplings and more particularly to a coupling for connecting together sections of pipe for conducting liquid gas or semi-solid material.

An object of my invention is to provide a coupling which permits two sections of pipe, or other tubular members, to be readily assembled and disassembled, but which serves to lock the sections together to prevent accidental displacement of one relative to the other.

Another object of my invention is to provide a coupling wherein an effective seal is readily established between tubular members and wherein the seal may be easily broken and re-established to permit disassembly and reassembly of the members.

Another object of my invention is to provide a coupling which is compact and which can be tightened with tools usually provided for such purpose.

Another object of my invention is to provide a coupling having a one-way clutch which will permit one tubular member to be freely inserted within the other, but which will prevent separation of the members unless the coupling is manually released.

Another object of my invention is to provide a coupling having a clutch for normally preventing separation of telescope members and a nut controlling said clutch to permit ready release thereof whenever it is desired to separate the members.

Other objects and advantages will become apparent as the description proceeds.

In the drawing:

Fig. 1 is a longitudinal, sectional view illustrating my novel coupling as being utilized to secure the ends of a connecting sleeve to a pair of pipe sections;

Fig. 2 is an enlarged, fragmentary, sectional view showing the position of the parts when the coupling is in normal position;

Fig. 3 is a view similar to Fig. 2, but showing the position of the parts when a force is exerted on a pipe section tending to withdraw it from the sleeve; and Fig. 4 is a view similar to Fig. 2, but showing the parts in released position to permit withdrawal of the pipe from the sleeve.

In Fig. 1, I have illustrated my invention as being utilized to form a sealed connection between a tubular sleeve 10 and a pair of pipe sections 12 and 14. The lefthand end of the sleeve 10 is threaded, as indicated at 16, and has an internal tapered surface 18 forming an abutment for an annular sealing gasket 20 of rubber or other suitable material. The external surface of the gasket 20 is tapered and slightly rounded, as indicated at 22, so that when the gasket is urged against a surface 18 with only a slight force, a sufficient seal is established to permit an initial test of the piping installation.

The gasket 20 is illustrated as having an annular sheet metal base 24, which is adapted to be engaged by the shoulder 26 of a tubular nut 28. The nut 28 has threads 30 which engage the thread 16 so that rotation of the nut in the appropriate direction forces the gasket 20 against the surface 18 and the external surface of the pipe section 12. The nut 28 is provided with a tapered recess 32 in the rear of the gasket and this tapered recess is adapted to receive an annular coil spring 34 which coacts with the tapered wall of the recess to prevent withdrawal of the pipe section 12. An important feature of my invention lies in the fact that the internal diameter of the coil spring 34 is normally greater than the external diameter of the pipe section 12, so that this pipe section may readily be inserted in the sleeve 10 when the coupling parts are in the untightened position shown at the left of Fig. 1.

The coupling at the righthand end of the sleeve 10 is identical with the coupling at the lefthand end of this sleeve and the parts are similarly numbered. The coupling at the righthand end of the sleeve 10, however, is illustrated as being in the tightened position and as forming a fluid-tight seal between the sleeve 10 and pipe section 14, capable of withstanding the maximum fluid pressure to which the pipe installation will be subjected. The position of the coupling parts in the righthand coupling of Fig. 1 is illustrated more clearly in Fig. 2, which shows these parts on an enlarged scale.

Whenever a force acts in such manner as to tend to force the end of pipe section 14 out of the righthand end of sleeve 10, the parts assume the position shown in Fig. 3. The arrow in this figure indicates that a force is tending to withdraw the pipe section 14 from the sleeve 10. The initial outward movement of the pipe section 14 will jam the annular spring 34 between the outer periphery of the pipe section 14 and the tapered wall of the recess 32, whereupon the spring 34 will tend to bite into these opposing walls and will resist further outward movement of the pipe section 14. In Fig. 3, the initial outward movement of the pipe section 14 is illustrated as slightly distorting the gasket 20 so that the rearward portion of this gasket projects slightly into the recess 32. The initial outward movement of the pipe section 14, before further movement of this pipe section is prevented by the spring 34, is so small that it does not have any material effect on the piping installation and may be disregarded.

In some instances the extension of the gasket 20 into the recess 32 may aid in shifting the annular spring 34 to locking position between the tapered wall of the recess and the pipe section. This is not essential, however, and is not relied upon, since the spring will move into locking position merely as a result of its frictional engagement with the external surface of the pipe section, even though the spring fits only loosely about the external surface of this pipe section. The spring 34 tends to bite into the external surface of the pipe section and the tapered surface of the recess 32 when a force tends to withdraw the pipe section from the sleeve and, in Figs. 3 and 4, the effect of this biting action is shown in exaggerated form.

A feature of my invention lies in the fact that the grip of the spring 34 can easily be broken by unscrewing the tubular nut 28, as indicated in Fig. 4. This is a great advantage over couplings wherein the locking means is confined between the two tubular members, since in such couplings it is difficult, and sometimes impossible, to separate the tubular members. With my improved coupling, however, the nut 28 can be unscrewed and the inner tubular member can then be readily withdrawn.

While I have illustrated and described only one embodiment of my invention, it is to be understood that my invention is not limited to the particular details shown and described, but may assume numerous other forms and that the scope of my invention is described in the following claims.

I claim:

1. A coupling for connecting a pair of tubular members adapted to be telescoped, said coupling comprising a tapered annular surface on the larger of said members, a sealing gasket engaging said surface and the external wall of the smaller tubular member, a collar surrounding the smaller of said tubular members and movable lengthwise thereof, said collar having a shoulder engaging said gasket for forcing said gasket into sealing contact with said tapered annular surface on the larger tubular member and the external wall of the smaller tubular member, releasable securing means for urging said collar toward said tapered surface on the larger tubular member to compress said gasket, said collar having a recess beyond said shoulder, said recess being provided with a tapered wall opposite and angularly related to the external wall of the smaller tubular member, and an annular coil spring located in said recess and cooperating with said tapered wall to force the spring into engagement with the inner tubular member for preventing withdrawal of the inner tubular member.

2. A coupling for connecting a pair of tubular members adapted to be telescoped, said coupling comprising a tapered annular surface on the larger of said members, threads carried by said last-named member, a sealing gasket engaging said surface and the external wall of the smaller tubular member, a nut surrounding the smaller of said tubular members and movable lengthwise thereof, said nut having threads for engaging said first-named threads, said nut having a shoulder engaging said gasket for forcing said gasket into contact with said tapered annular surface on the larger of said members and the external wall of the smaller tubular member, said nut having a recess beyond said shoulder, said recess being provided with a tapered wall opposite and angularly related to the external wall of said smaller member, said recess being of large enough diameter to receive a spring of greater normal inside diameter than the external diameter of the smaller tubular member, and an annular coil spring located in said recess and cooperating with said tapered wall to force the spring into engagement with the inner tubular member for preventing withdrawal of the inner tubular member, said spring having a normal inside diameter larger than the external diameter of the smaller tubular member.

FRANCIS A. McMURRAY.